United States Patent
Jaber et al.

(10) Patent No.: US 8,938,626 B2
(45) Date of Patent: Jan. 20, 2015

(54) SINGLE COMMAND FUNCTIONALITY FOR PROVIDING DATA SECURITY AND PREVENTING DATA ACCESS WITHIN A DECOMMISSIONED INFORMATION HANDLING SYSTEM

(75) Inventors: Muhammed Jaber, Austin, TX (US); Jon Hass, Austin, TX (US); Theodore Webb, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 57 days.

(21) Appl. No.: 13/551,033

(22) Filed: Jul. 17, 2012

(65) Prior Publication Data
US 2014/0025947 A1  Jan. 23, 2014

(51) Int. Cl.
G06F 21/00 (2013.01)
G06F 21/62 (2013.01)

(52) U.S. Cl.
CPC ..................................... G06F 21/62 (2013.01)
USPC .............. 713/193; 713/164; 380/277; 726/26

(58) Field of Classification Search
None
See application file for complete search history.

(56) References Cited

U.S. PATENT DOCUMENTS

| | | | |
|---|---|---|---|
| 5,901,285 A | 5/1999 | Labatte et al. | |
| 7,114,082 B2 * | 9/2006 | Klein | 713/193 |
| 7,228,379 B2 | 6/2007 | Bress et al. | |
| 7,246,209 B2 | 7/2007 | Tran et al. | |
| 7,278,016 B1 * | 10/2007 | Detrick et al. | 713/2 |
| 7,430,136 B2 | 9/2008 | Merry, Jr. et al. | |
| 7,783,824 B2 | 8/2010 | Nakazawa et al. | |
| 8,024,532 B2 | 9/2011 | Taguchi et al. | |
| 8,108,667 B2 | 1/2012 | Mittadalli et al. | |
| 8,429,420 B1 * | 4/2013 | Melvin | 713/189 |
| 2006/0143443 A1 * | 6/2006 | Cohen et al. | 713/158 |
| 2010/0262817 A1 | 10/2010 | Edmiston et al. | |

OTHER PUBLICATIONS

Hughes et al., Disposal of Disk and Tape Data by Secure Sanitization, IEEE, 2009.*
Hynes, Keys to Protecting Data with BitLocker Drive Encryption, Tech Net Magazine, 2007.*

(Continued)

*Primary Examiner* — Minh Dinh
(74) *Attorney, Agent, or Firm* — Isidore PLLC

(57) ABSTRACT

A computer-implemented method comprises a service processor: establishing a kill switch encryption key (KSEK) to provide data security for data within storage devices of configurable components within a system; automatically encrypting, with the KSEK, data that is written to one of the storage devices; configuring the configurable components to prevent access to the stored data unless a valid copy of the KSEK is received from the service processor along with the request for the data; automatically decrypting, with the KSEK, the KSEK-encrypted data that is read from storage device; and in response to receiving a verified request to decommission the system, performing the decommissioning by deleting/erasing the KSEK from a secure storage at which the only instance of the KSEK is maintained. Deletion of the KSEK results in a permanent loss of access to the stored encrypted data within the system because the stored encrypted data cannot be decrypted without the KSEK.

18 Claims, 8 Drawing Sheets

(56) References Cited

OTHER PUBLICATIONS

Self-Encrypting Drives for Servers, NAS and SAN Arrays, Seagate Technology LLC, 2009.*

Ferguson, AES-CBC + Elephant diffuser—A Disk Encryption Algorithm for Windows Vista, Microsoft Corp., 2008.*

Windows BitLocker Drive Encryption Frequently Asked Questions, Microsoft, May 2011.*

* cited by examiner

SINGLE COMMAND FUNCTIONALITY FOR PROVIDING DATA SECURITY AND PREVENTING DATA ACCESS WITHIN A DECOMMISSIONED INFORMATION HANDLING SYSTEM

BACKGROUND

1. Technical Field

The present disclosure generally relates to providing data security within an information handling system and in particular to enabling a single command functionality that destroys access to specific data stored within an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system can be provisioned as a customer system providing specific computer resources to a single customer. The provisioned customer system can range from a single, stand-alone computer system to a distributed, multi-device computer system. Within the customer system are a number of configurable components that include firmware and/or logic and associated storage devices, such as non-volatile random access memory (NVRAM). The configurable components can be instantiated with customer-specific configuration settings and can include customer data stored within their respective NVRAMs. The configuration settings (data) and customer data are unique to the customer and can include sensitive information that the customer needs to protect. Protection of customer data conventionally includes use of a firewall and restricted logins to the customer system via security credentials (e.g., password-based logins). While these security measures can keep most un-authorized persons from gaining access to this data, these measures do not prevent a skilled hacker who can by-pass these initial security measures and gain access to the customer system from simply accessing the stored customer data and configuration settings data from the various NVRAMs within the system.

Also, these customer systems are occasionally decommissioned and/or re-provisioned. A typical decommissioning of a customer system involves erasing/deleting the customer data that is stored on the physical storage devices associated with the system. This erasure of customer data is typically needed for both security and compliance, and the process normally involves administrative personnel having to perform manual steps to delete the stored customer data and individually reset the potentially large number of configurable components and associated physical storage devices back to factory defaults. Such manual steps can be costly and time consuming and are subject to human errors. Furthermore, some storage media are designed such that although a user or administrator attempts to erase the media, the media may still contain remnants of the customer's data. An example of this type of storage media is flash with wear-leveling technologies. With wear leveling technology, an erasure of a logical device does not necessarily result in erasure of the entire physical device. Thus, even after a seemingly successful erasure of customer data, the physical storage media on which that data has been stored can still maintain portions of the customer data, which data can then be accessed despite the best efforts taken to wipe the storage device clean of all the customer data.

BRIEF SUMMARY

Disclosed is a method for enabling data security within a kill switch Enabled (KSE) information handling system (IHS) by providing a single encryption key erasure ("kill switch") command as a quick, robust and secure method to securely decommission the IHS and prevent future access to the encrypted data that exist within the system at the time of decommissioning the IHS. According to a first embodiment, the method comprises: a service processor establishing a kill switch encryption key (KSEK) to provide data security for data stored within one or more storage devices that are associated with one or more configurable components of an IHS; configuring the one or more configurable components to provide access to and enable decryption of data stored within the one or more storage devices only when a valid copy of the KSEK is received from the service processor along with a request for access to the stored data; automatically encrypting, with the KSEK, data that is written to the one or more storage devices; automatically decrypting, with the KSEK, the KSEK-encrypted data that is read from the one or more storage device; and in response to receiving a verified request to decommission the IHS, deleting the KSEK from a secure storage at which the KSEK is securely maintained. According to one aspect of the method, because the stored data can only be decrypted to a usable form by using the KSEK, deletion of the KSEK results in a permanent loss of access to the stored KSEK-encrypted data in each of the one or more storage devices in the IHS. According to another aspect of the method, only a single instance of the KSEK is maintained, and this single instance of the KSEK is maintained within a secure storage and can only be retrieved by the service processor.

According to one embodiment, the method further includes: in response to a request for access to the stored data within a target storage device, retrieving the KSEK from the secured storage and passing the KSEK to a controller of the target storage device to enable the controller to retrieve the stored data; decrypting the stored data to create usable data, and providing the usable data as a result of the request; and in response to a request to write data to a target storage device within the IHS, retrieving the KSEK from the secure storage and forwarding the KSEK to the controller of the configurable component, whereby the controller encrypts the data to be written with the KSEK to generate KSEK-encrypted data, and stores the KSEK-encrypted data within the target storage device.

Also disclosed is an information handling system (IHS) comprising: a processor; a memory coupled to the processor via a system interconnect; one or more configurable components having associated storage devices for storing data; and a service processor having firmware executing thereon to provide security to the stored data and to securely decommission the system to prevent access to the stored KSEK-encrypted data. In one embodiment, the firmware configures the service processor to perform various functions, similar to the above described method functions, in order to enable data security within the IHS by providing a single encryption key erasure command as a quick, robust and secure method to securely decommission the IHS and prevent future access to the KSEK-encrypted data associated with the decommissioned IHS.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
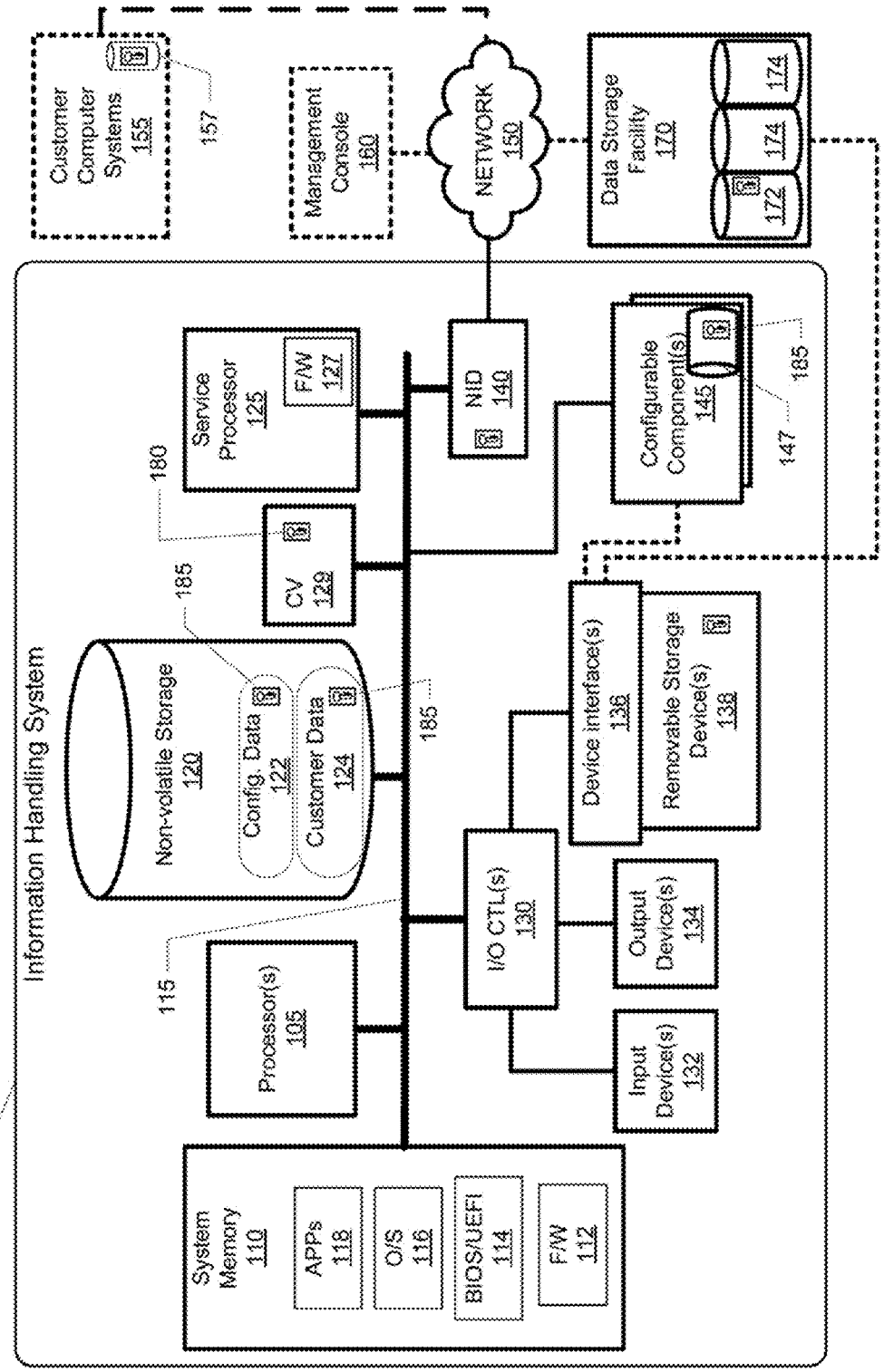
FIG. 1 illustrates an example information handling system within which various aspects of the disclosure can be implemented, according to one or more embodiments.

The illustrative embodiments provide an information handling system (IHS) and a method performed within the information handling system for (1) enabling data security within storage devices/resources of the IHS and (2) providing a single encryption key erasure ("kill switch") command as a quick, robust and secure method to securely decommission the IHS and prevent future access to KSEK-encrypted data that exist within storage devices at the time of decommissioning the IHS. Specifically, one or more embodiments provide a computer-implemented method that comprises: a service processor service processor establishing a kill switch encryption key (KSEK) to provide data security for data stored within one or more storage devices that are associated with one or more configurable components of an IHS; configuring the one or more configurable components to provide access to and enable decryption of data stored within the one or more storage devices only when a valid copy of the KSEK is received from the service processor along with a request for access to the stored data; automatically encrypting, with the KSEK, data that is written to the one or more storage devices; automatically decrypting, with the KSEK, the KSEK data that is read from the one or more storage device; and in response to receiving a verified request to decommission the IHS, deleting the KSEK from a secure storage at which the KSEK is securely maintained. According to one aspect of the method, because the stored data can only be decrypted to a usable form by using the KSEK, deletion of the KSEK results in a permanent loss of access to the stored data in each of the one or more storage devices in the IHS. According to another aspect of the method, only a single instance of the KSEK is maintained, and this single instance of the KSEK is maintained within a secure storage and can only be retrieved by the service processor. One alternate embodiment provides at least one backup copy of the KSEK, which is stored outside of the system and which can only be retrieved via pre-established authentication procedures by an authorized administrator in the event the KSEK within the system is accidentally erased, lost to or cannot be retrieved by the service processor, or corrupted.

According to another aspect of the disclosure, one or more embodiments provide for a level of indirection with the use of the KSEK. With these embodiments, rather than provide a single KSEK for use with the encryption processes, the service processor utilizes the received KSEK as a master KSEK and then utilizes the master KSEK to encrypt one or more subordinate KSEKs. The master KSEK can then be described a system-level KSEK, while the subordinate KSEKs can be described as device-level or component-level KSEKs. Each of the one or more subordinate KSEKs (interchangeably referred to hereinafter as a "sub-KSEK") can then be utilized to encrypt configuration and/or customer data within individual components/devices. Further, one or more implementations of these embodiments can involve multiple levels of indirection, whereby the sub-KSEKs can themselves encrypt a lower level of subordinate KSEKs. These second, third and/or lower level subordinate KSEKs will all operate once the master KSEK is available, and the sub-KSEKs will enable access to the particular encrypted data. Deletion of the master KSEK then operates to prevent decryption of the sub-KSEKs and consequently prevents decryption of the sub-KSEK-encrypted configuration and/or customer data for read access thereto.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As provided within the disclosure, references to the term "kill switch" refers to the functionality that causes sensitive customer configuration data (which is KSEK-encrypted) to be permanently lost and/or unreadable and/or irretrievable, following the execution of a single encryption key erasure command. Execution of this single encryption key erasure command (i.e., the kill switch) permanently deletes the established KSEK utilized for system-wide encryption of sensitive customer configuration data from a secure storage in which the KSEK is maintained. References to kill switch and encryption key erasure command have been utilized interchangeably throughout the disclosure.

Also, throughout the description of the various embodiments of the disclosure, reference is made to configuration (settings) data and/or customer configuration data and specifically to the utilization of a system-level KSEK that is utilized to secure the respective data. When a system is provisioned for a particular customer (or user), certain devices and/or components within the system can be configured with specific configuration settings and be provided with customer data and/or information specific to the requirements and/or needs and/or operations of the particular customer. The data related to the configuration settings of the components/devices is referred to herein as configuration data. Data that is generated by and/or stored within the system that is associated with the particular customer (e.g., customer identifying data, client data, financial data, data from proprietary customer processes, and the like) is referred to herein as customer data. It is appreciated that, in one or more implementations, configuration data can be synonymous with customer data or vice versa. Both configuration data and customer data can be sensitive and/or proprietary data that needs to be securely maintained within the system. For simplicity in describing the remainder of the disclosure reference is made generally to customer configuration data and/or sensitive customer configuration data to encompass all types of data being protected by the features described herein.

Each device or component that can be configured with specific configuration data within the larger system is referred to as a configurable component. The configurable components described herein each have some level of intelligence (e.g., processing logic) and can be provided with or have access to an associated physical storage. In the described embodiments, the physical storage is described as being non-volatile random access memory (NVRAM).

As described throughout, data security is maintained via use of a KSEK and involves KSEK-encryption and subsequent KSEK-decryption of data stored within the storage devices of the system. For consistency throughout the figures, the presence of data secured via KSEK-encryption is illustrated as a cylindrical shaped object, representative of storage and/or a data structure, on which is superimposed the outline of a physical key. The presence of this specific type of KSEC-encrypted data is referred to as secured data and is identified with reference numeral 185 throughout the figures. Within the individual components presented, and particularly the configurable components, the secured data is assumed to be stored within a storage device of the specific configurable component, which can be internal storage device or an external storage device, depending on the particular configurable component. Also, within the figures KSEK is represented as a key without a surrounding cylinder, and KSEK is identified with reference numeral 180.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes processor(s) 105 coupled to system memory 110 via system interconnect 115. System interconnect 115 can be interchangeably referred to as a system bus, in one or more embodiments. Also coupled to system interconnect 115 is nonvolatile storage 120 within which can be stored one or more software and/or firmware modules (not specifically shown) and one or more sets of data, of which configuration data 122 and customer data 124 are illustrated. According to the described embodiments, one or both of configuration data 122 and customer data 124 can be protected via use of a KSEK 180 illustrated within protected storage 129, which is an example of a secure storage, as described in greater detail herein. The one or more software and/or firmware modules within nonvolatile storage 120 can be loaded into system memory 110 during operation of IHS 100. As shown, system memory 110 can include therein a plurality of such modules, including firmware (F/W) 112, basic input/output system (BIOS) 114, operating system (O/S) 116, and application(s) 118.

In one or more embodiments, BIOS 114 comprises additional functionality associated with unified extensible firmware interface (UEFI), and can be more completely referred to as BIOS/UEFI in these embodiments. The various software and/or firmware modules have varying functionality when their corresponding program code is executed by processor(s) 105 or other processing devices within IHS 100. In one embodiment, one or more of these modules, and particularly BIOS 114, can be utilized to configure one or more configurable components 145 during system start-up (or system initialization) and/or thereafter to enable the one or more configurable components 145 to support use of a KSEK to provide secure data storage within respective storage devices 147 corresponding to the configurable components 145.

Also coupled to system interconnect 115 is service processor 125, which has service processor firmware (F/W) 127. Service processor 125 is responsible for completing various aspects of the processes involved with the establishment and use of the KSEK 180. According to the illustrative embodiment of FIG. 1, KSEK 180 is locally stored within protected storage 129. As provided herein, protected storage 129 is a secure storage device from which KSEK cannot be accessed, except for specific processes triggered by service processor 125. Further, protected storage 129 is a NVRAM flash storage that does not support wear-leveling. Thus, only a single instance of a KSEK is stored within the system, and deletion of that instance of the KSEK permanently deletes the KSEK and renders all KSEK-encrypted data inaccessible. To enable faster processing of RD/WR operations, service processor 125 can also include a locally stored copy of KSEK 180, in one embodiment. With this alternate embodiment, a verified kill switch command automatically deletes/erased KSEK 180 from both service processor 125 and protected storage 129.

IHS 100 further includes one or more input/output (I/O) controllers 130 which support connection by, and processing of, signals from one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interfaces 136, such as an optical reader, a universal serial bus (USB), a card reader, Personal Computer Memory Card International Association (PCMCIA) slot, and/or a high-definition multimedia interface (HDMI), can be associated with IHS 100. Device interface(s) 136 can be utilized to enable data to be read from or stored to corresponding removal storage device(s) 138, such as a compact disk (CD), digital video disk (DVD), flash drive, or flash memory card. In one or more embodiments, device interface(s) 136 can also provide an integration point for connecting other device(s), such as configurable components 145 to IHS 100. In such implementation, device interfaces 136 can further include General Purpose I/O interfaces such as $I^2C$, SMBus, and peripheral component interconnect (PCI) buses. As illustrated, configurable components 145 can be directly connected to system interconnect 115 as an integral part of IHS 100. While shown as having a physical connection through system interconnect 115 (or alternatively through device interface(s) 136), it is appreciated that alternate embodiments can provide that configurable components 145 are communicatively connected within IHS 100 via a wireless connection within IHS 100.

As described above, configurable components 145 represent any device or component within IHS 100 that can be configured with a specific configuration setting and which includes internal storage 147 in which configuration and/or customer data can be securely stored utilizing the KSEK functionality described herein. Examples of configurable components 145 can include storage adapters, network interface controllers, enclosure service processors, power supply, power backup and power management subsystems, Fibre Channel, Infiniband, and other fabric interfaces. Other examples include controllers that include initiators for storage technologies such as iSCSI and FCoE, and PCIe Bridges and Switches. The functionality described herein can be utilized with numerous different types of configurable components, including both hardware-enabled and software-enabled components, and the presentation herein of specific examples of configurable components does not limit the application of the described features and functionality to only those specific examples of configurable components. Within the larger system, these configurable components 145 can represent components manufactured by third party vendors, and the storage device 147 within these configurable components 145 can be flash media or media that supports wear leveling technology when storing data.

IHS 100 comprises a network interface device (NID) 140, which can be a specific example of a configurable component within IHS 100. NID 140 enables IHS 100 and/or service processor 125 to communicate and/or interface with other devices, services, and components that are located external to IHS 100. These devices, services, and components can interface with IHS 100 via an external network, such as example network 150, using one or more communication protocols. In one embodiment, a customer provisioned system/platform can comprises multiple devices located across a distributed network, and NID 140 enables IHS 100 and/or service processor 125 to be connected to these other devices, such as customer computer systems 155, for example. It is appreciated that the various embodiments of the disclosure enable the implementation of a single encryption key erasure command and associated functionality of a KSEK for all configurations of a provisioned system/platform, including one having separate devices distributed across a network.

Network 150 can be a local area network, wide area network, personal area network, and the like, and the connection to and/or between network and IHS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

In the illustrative embodiment, network 150 also provides access to data storage facility 170, which can include a plurality of physical disks or other storage media. As shown, a first storage media 172 within data storage facility 170 has one or more of customer data and configuration data stored therein, encrypted with KSEK-encryption. This data, unlike data stored within the other storage media 174 of data storage facility 170, are KSEK-encrypted and can only be decrypted by: (a) the device itself when the device is provided with the KSEK by the service processor 125, and/or (b) the service processor 125 using the pre-established KSEK 180. In an alternate embodiment, and as represented by the second set of dashed interconnecting lines, data storage facility 170 can be directly connected to IHS 100 as an external storage device.

NID 140 also enables access to IHS 100 by management console 160 through network 150. According to one embodiment, management console 160 provides one mechanism by which the kill switch command can be communicated to IHS 100 and particularly to service processor 125. Management console 160 provides access to IHS 100 by administrative personnel responsible for provisioning a customer system and also responsible for decommissioning the system and re-provisioning the system.

The remainder of the disclosure references specific functionality provided by service processor 125 and specifically by execution of firmware 127 within service processor 125 as related to creation and utilization of the KSEK. According to one embodiment, service processor F/W 127 includes program code that configures the service processor 125 to provide the various functions described within the present disclosure. Specifically, the firmware 127 configures the service processor 125 to: establish a kill switch encryption key (KSEK) to provide data security for data stored within one or more storage devices that are associated with one or more configurable components of an IHS; configure the one or more configurable components to provide access to and enable decryption of data stored within the one or more storage devices only when a valid copy of the KSEK is received from the service processor along with a request for access to the stored data; automatically encrypt, with the KSEK, data that is written to the one or more storage devices; and in response to receiving a verified request to decommission the IHS, delete the KSEK from a secure storage at which the KSEK is securely maintained. According to one aspect of the method, wherein the stored data can only be decrypted to a usable form by using the KSEK, and deletion of the KSEK results in a permanent loss of access to the stored data in each of the one or more storage devices in the IHS.

According to one embodiment, the F/W 127 further configures the service processor 125 to perform processes including: in response to receiving a request to read the stored data within a target storage device: retrieve the KSEK from the secured storage and pass the KSEK to a controller of the target storage device to enable the controller to retrieve the stored data; decrypt the stored data to create usable data, and provide the usable data as a result of the request. Further, the service processor 125 is configured to perform processes including: in response to a request to write data to a target storage device within the IHS 100: retrieve the KSEK from the secure storage; forward the configuration data to be written and the KSEK to the controller to trigger the controller of the configurable component to encrypt the configuration data using the KSEK, thus generating KSEK-encrypted data, which the controller then stores within the target storage device.

Figure 2:
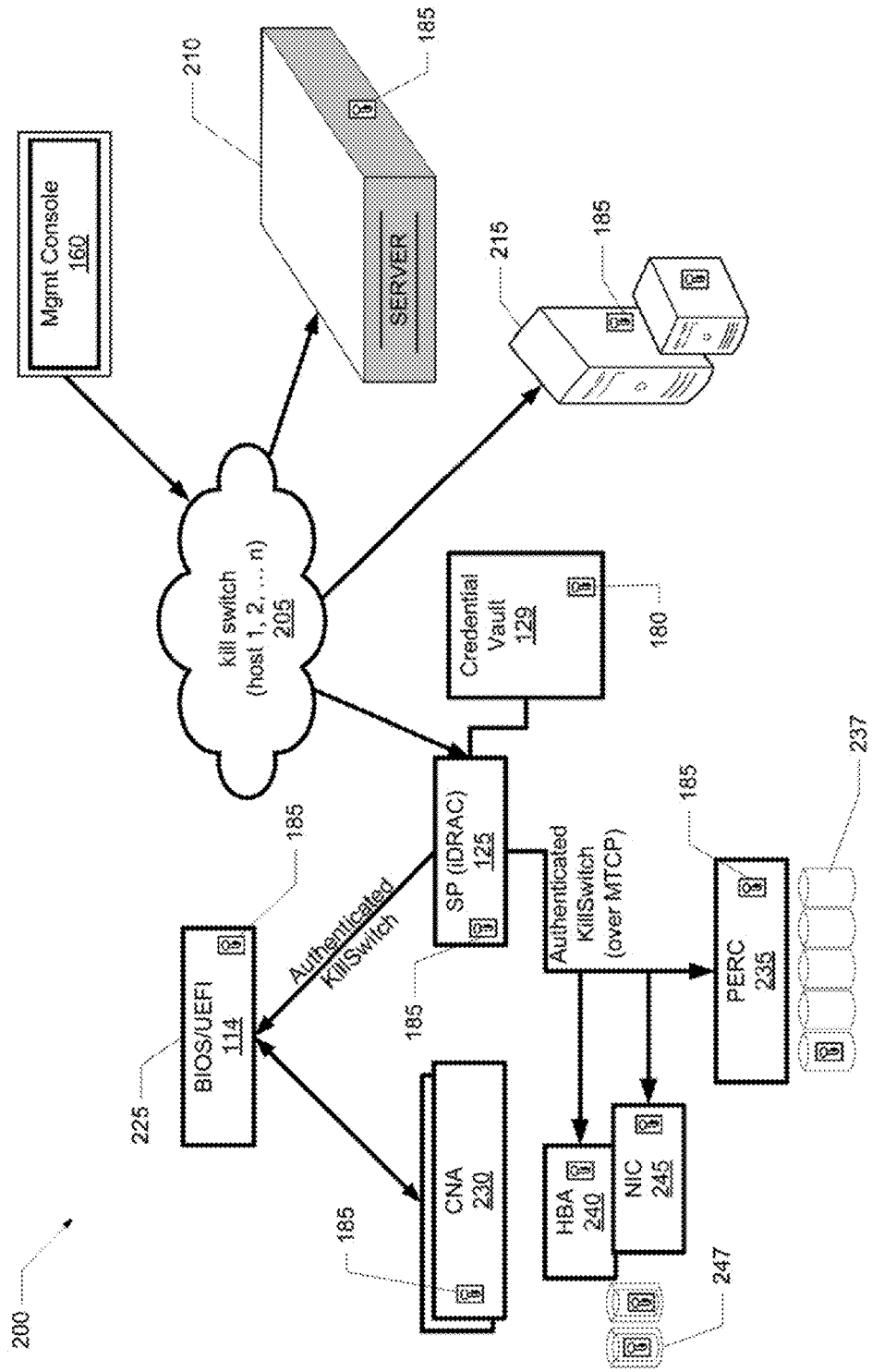
FIG. 2 illustrates a component level view of an example kill switch Enabled (KSE) system having a service processor and other functional components that support a system-level decommissioning function via a single encryption key erasure ("kill switch") command, in accordance with one or embodiments.

With reference now to FIG. 2, there is illustrated one embodiment of a component level view of a KSE system 200 having a service processor and other functional components that support a system-level kill switch function to protect data stored in a plurality of different storage devices within the system. System 200 can be a system provisioned for a single customer and includes one or more configurable components and associated storage devices. As shown by the placement of the icons representing secured data 185, system 200 has been configured, based on the methodology described herein, to provide data security across all devices on which data can be stored within system 200. System 200 comprises an external server 210 and a plurality of customer desktop devices 215, each having KSEK-encrypted secured data 185 stored thereon. System 200 further includes service processor 125 communicatively connected to converged network adapter (CNA) 230 via BIOS/UEFI 114, and directly to PowerEdge Expandable RAID Controller (PERC) 235, host bus adapter (HBA) 240, and network interface card (NIC) 245. PERC 235 controls access to a plurality of storage media 237 (collectively referred to as a RAID—Redundant Array of Independent Disks), which can exist internal to the physical system or on an external network, similar to data storage facility 170 in FIG. 1.

CNA 230, PERC 235, HBA 240 and NIC 245 are specific examples of configurable components 145 of FIG. 1. Each of these configurable components (CNA 230, PERC 235, HBA 240, NIC 245) includes separate logic (not shown) and an internal NVRAM storage, within which one or more of configuration data and customer data (represented as KSEK-encrypted secured data 185) can be stored. Additionally, HBA 240 and NIC 245 provide access to external storage devices 247, while PERC 235 provides access to external RAID 237. Data stored within these external storage devices (237/247) are also secured using the KSEK-encryption described herein. Aspects of the disclosure involves the vendor of each configurable component designed for inclusion in a customer platform to pre-configure the component to include firmware and/or logic that enables the component to support automatic encryption of all configuration and customer data with a KSEK credential that is provided to the component during initialization of that component. Specifically, the configurable component can be pre-configured/pre-programmed to interact with BIOS/UEFI 114 during system initialization to: (1) receive from the service processor or in an alternate embodiment, from the BIOS, a copy of KSEK 180, (2) indicate receipt of the KSEK and confirm being able to encrypt, with the KSEK, the configuration and/or customer data provided to the component by the BIOS during initialization, and (3) encrypt any received data from the BIOS 114 using KSEK-encryption. Furthermore, in one embodiment, the configurable component is pre-programmed/pre-configured to prevent reading of stored data within the component's NVRAM unless the request to read the data is accompanied by a KSEK. Each configurable component (and other devices) in a KSE system is required to support these features in order to obtain the robust system-level kill switch feature described herein. It is further appreciated that aspects of the disclosure enable extension of the described features to user data in addition to configuration data, whereby the user data can be KSEK-encrypted and stored within a solid state drive (e.g., one which utilizes wear leveling). This KSEK-encrypted user data is also lost (i.e., can no longer be read) once the KSEK comment is triggered to erase the system-level or master KSEK.

Central to the concepts disclosed herein and to the processing of data within system 200 is the introduction and utilization of kill switch operation 205, which generally represents a specific system-level command that, when executed by service processor 125 within system 200, deletes the single instance of a pre-established KSEK 180 from secure storage (e.g., protected storage 129) within system 200. When system 200 is a managed system, kill switch operation 205 can be triggered by entry of the kill switch command at management console 160. Entry of the kill switch command can require super administrative privilege that is authenticated prior to execution of the command within system 200. As illustrated, execution of kill switch operation 205 affects all devices within the distributed system 200, including those components that are communicatively connected to service processor 125 as well as the devices (server 210 and desktop devices 215) external to the physical system on which service processor 125 is hosted. For configurable components, kill switch operation 205 is communicated to service processor 125 and service processor 125 performs the required operations/processes to effect the kill switch operation 205 across each of the configurable components. As indicated, in one embodiment, service processor 125 notifies the different configurable components and BIOS/UEFI 114 that an authenticated kill switch operation has been triggered on the system 200.

Notably, according to one embodiment, execution of kill switch operation 205 does not actually remove any of the data stored within the system 200, but rather renders the data inaccessible and/or unreadable. In another embodiment, however, execution of kill switch operation 205 also triggers a re-provisioning of system 200, whereby certain erasure and/or reformatting procedures are implemented across the system 200. Thus, in one embodiment, firmware 127 of service processor 125 can include program code that: in response to completing the deletion of the KSEK from the secure storage, triggers one or more of: (a) a deletion of all encrypted configuration data and customer data within each storage device corresponding to the one or more components within the system; and (b) a reset to factory default of all devices and/or components and corresponding storage facilities within the system.

According to one aspect of the disclosure, the process by which the service processor 125 receives a verified request to delete KSEK 180 from a secure storage includes the firmware 127 configuring the service processor 125 to perform the operations/processes to: receive a request to perform at least one of: (a) decommissioning the KSE system and (b) re-provisioning the KSE system; compare a requestor identifier (R_ID) associated with the request with a pre-established administrative identifier (A_ID) having a highest level administrative privilege; responsive to the R_ID matching the A_ID, prompt for confirmation of the received request, while providing a notification indicating a permanent loss of access to data as a result of carrying out the request. According to one embodiment, prompting for confirmation comprises requesting entry of one or more administrative passcodes to confirm that the request is from an approved A_ID. It is appreciated that alternate methods can be implemented for performing the user authentication and verification, and that the disclosure is intended to encompass each of these alternate methods. The firmware 127 also configures the service processor 125 to perform a deletion of the KSEK from the secure storage only in response to an affirmative response to the prompting for confirmation (e.g., entry of a confirmed administrative passcode), where the affirmative response indicates that the request is a verified request.

According to one aspect of the disclosure illustrated by FIG. 2, service processor 125 also communicates the KSEK to platform devices during initialization of the devices. This communication of the KSEK can be performed either directly, where a communication path is available such as a management controller transport protocol (MCTP) over $I^2C$ sideband channel, or indirectly through a proxy, such as the BIOS/UEFI 114, depending on implementation. BIOS/UEFI 114 may use one or more standardized or proprietary mechanisms, such as PCI-CLP or UEFI Platform to Driver Protocol, to communicate the KSEK to the platform devices.

Figure 3:
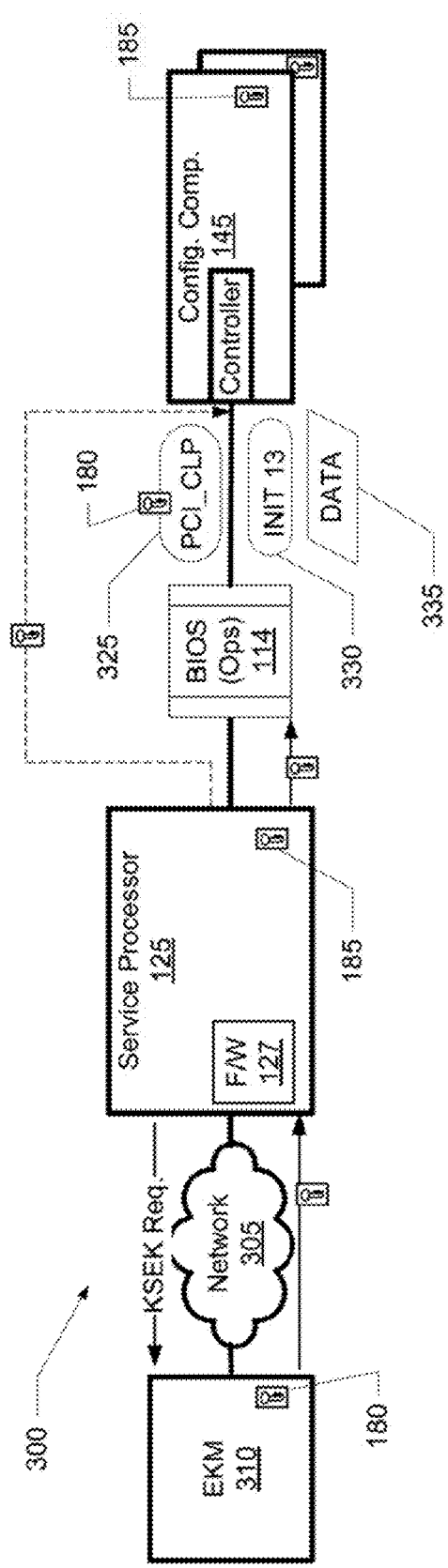
FIG. 3 is a block diagram illustrating the use of basic input/output system (BIOS) operations to configure each of the configurable components of an example system utilizing a kill switch encryption key (KSEK), in accordance with one embodiment.

FIG. 3 illustrates a system diagram illustrating interaction between configurable components 145 and BIOS/UEFI 114 to establish the kill switch functionality during initialization of a system, in accordance with one embodiment. According to one aspect of the disclosure, in order to make a system a KSE system, certain components within the system have to be configured when initializing the system. In addition to the vendor of the components pre-programming the components to be able to support KSEK functions, the service processor 125 and BIOS 114 of the system is also enhanced to provide certain functions during system start-up and/or initialization to enables these devices to support the use of a KSEK and the functionality associated therewith. System diagram 300 includes service processor 125 and a plurality of configurable components 145. Service processor 125 is communicatively connected to enterprise key manager (EKM) 310 via network 305. According to one embodiment, establishing the KSEK involves generation of the KSEK via EKM 310. With this embodiment, following system power on and/or prior to initialization of configurable components 145, firmware 127 of service processor 125 forwards a request to EKM 310 for generation of a KSEK. EKM 310 generates KSEK 180 and forwards KSEK 180 to service processor 125. Service processor 125 then forwards KSEK 180 to each configurable component. In an alternate embodiment, however, service processor 125 can forward KSEK 180 to BIOS 114, which provides a set of BIOS operations to interject KSEK 180 within the initialization and configuration of each of configurable components 145. As illustrated, according to this alternate embodiment, each configurable component is passed a copy of KSEK 180 by a specific BIOS operation, PCI_CLP 325. The configurable components 145 utilize KSEK 180 to encrypt configuration and/or customer data 335 received from BIOS 114 during the initialization process, and the KSEK-encrypted secure data 185 is stored within an internal NVRAM of the particular configurable components (145).

According to one aspect of the disclosure, BIOS 114 discovers each of the configurable components within the system by scanning the PCIe bus during power on self test (POST) operations. BIOS 114 then executes a series of entry points into components 145 while initializing components 145. According to the illustrative embodiment, PCI_CLP 325 represents one entry point during which BIOS 114 forwards KSEK 180 for temporary use by each configurable component 145 during initialization. BIOS 114 then performs a series of other operations, including INIT 13 330, to verify that the configurable component 145 did receive the KSEK 180 and is pre-configured (i.e., has been pre-programmed with the required logic/firmware) to encrypt specific BIOS-provided data 335 using the KSEK 180 prior to storing configuration and/or sensitive customer configuration data 335 to the component's NVRAM. Once the verification of a component is complete, BIOS 114 forwards configuration and/or sensitive customer configuration data 335 to the verified components (145), which may be only a subset of the total number of configurable components 145 initially discovered.

According to one embodiment, the firmware that configures the service processor 125 to establish the KSEK comprises firmware code that configures the service processor to: automatically access a remote enterprise key manager (EKM) during initialization of the IHS 100; request the KSEK from the EKM 310; and store the KSEK within a secure storage associated with the service processor to enable local platform key management. Also, the firmware that configures the service processor to configure the one or more configurable components comprises firmware code that configures the service processor 125 to perform functions including: responsive to receipt of the KSEK, pass the KSEK to each of the one or more configurable components, or in an alternate embodiment, to the basic input output system (BIOS 114). With this alternate embodiment, the BIOS 114 identifies each of the one or more configurable devices during a power on self test (POST), provides a copy of the KSEK to each of the one or more configurable components during device initialization, confirms that each of the one or more configurable components is pre-configured to support utilization of the KSEK for data security, and passes additional configuration data to each of the one or more configurable components that is pre-configured to support utilization of the KSEK for data security. Each of the one or more configurable components that support utilization of the KSEK encrypts the additional configuration data with the KSEK, prior to storing the encrypted configuration data within a storage device associated with the configurable component.

According to one aspect of the disclosure, a BIOS operation to configure a particular configurable component to support KSEK functionality will fail in response to the particular configurable component not indicating that the component is pre-programmed to utilize the KSEK to encrypt the additional configuration data being provided to the component by the BIOS. In one embodiment, the component is allowed to initialize in an un-configured state, whereby the component does not include any of the configuration settings and/or customer data. Also, access to static data, such as the firmware image, is enabled, while access to NVRAM is not enabled for each component unless the KSEK is first retrieved by the service processor and provided along with the requested access.

Following the initialization and configuration processes, according to one embodiment, the firmware further configures the service processor to: generate a system-level data security check that queries each configurable component within the system to determine whether the component supports a system-level kill switch feature, wherein the system-level kill switch feature: (1) enables all stored data of a pre-identified type to be automatically encrypted using the KSEK prior to storage of the KSEK-encrypted data, and (2) prevents all stored data of the pre-identified type from being accessible following deletion of the KSEK from a secure storage; in response to the system-level data security check indicating that at least one configurable component does not support the system-level kill switch feature, signal a data security risk within the system, stall one or more processes from occurring within the system, and identify a location of the configurable component corresponding to the data security risk; and in response to the system-level data security check indicating that all of the one or more configurable components within the system supports the platform-level kill switch feature, provide a response indicating that the system has passed the system-level data security check.

FIG. 3 introduces the concept of the KSEK 180 being generated by an external/remote EKM 310 and the service processor 125 receiving the KSEK 180 from the external/remote EKM 310. As the name indicates, EKM 310 is a secure server from which a customer platform can request and receive the unique KSEK 180 that is utilized to protect specific types of data across an entire system/platform, in one embodiment. The specific type of data is referenced throughout the disclosure as configuration and/or customer data, without limitation as to what that data can include. With this embodiment, KSEK 180 can also be maintained by EKM 310 and retrieved as needed by service processor 125. As a first alternate embodiment, KSEK 180 is generated by EKM 310 but is locally maintained within a secure storage, such as protected storage 129 (FIGS. 1 and 2), which can provide an encrypted storage. Additional alternate embodiments involve both local generation of the KSEK 180 by the service processor 125 and local KSEK management/storage within protected storage 129. Service processor 125 can provide local generation of KSEK 180 during initialization of the system via one of multiple methods, including: (a) determination of a hash code of a provided alphanumeric value, and (b) random generation of a value utilizing a random value generation module. Once generated, service processor 125 saves/stores KSEK 180 within protected storage 129.

Figure 4A:
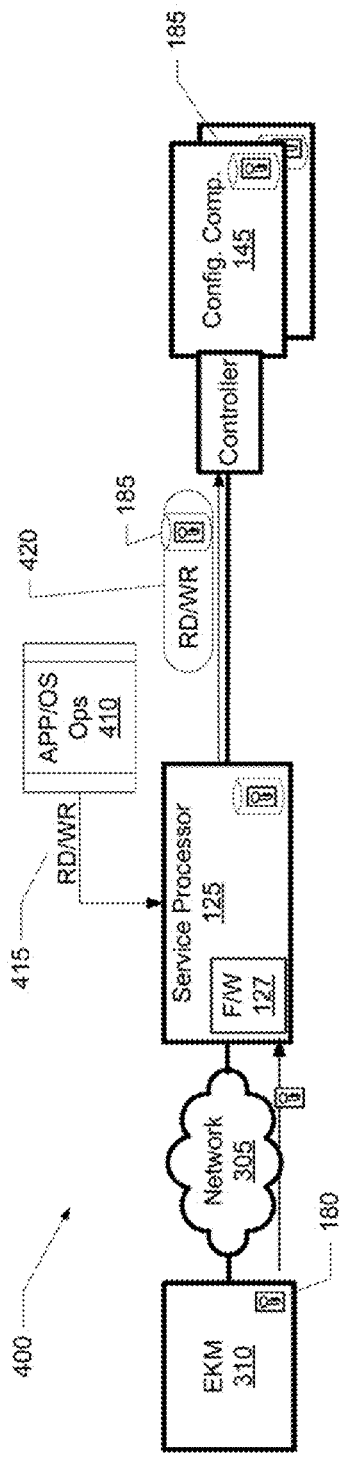
FIG. 4A illustrates a first configuration of a KSE system providing secure access to stored data utilizing a remotely/externally-stored KSEK, in accordance with one embodiment.
Figure 4B:
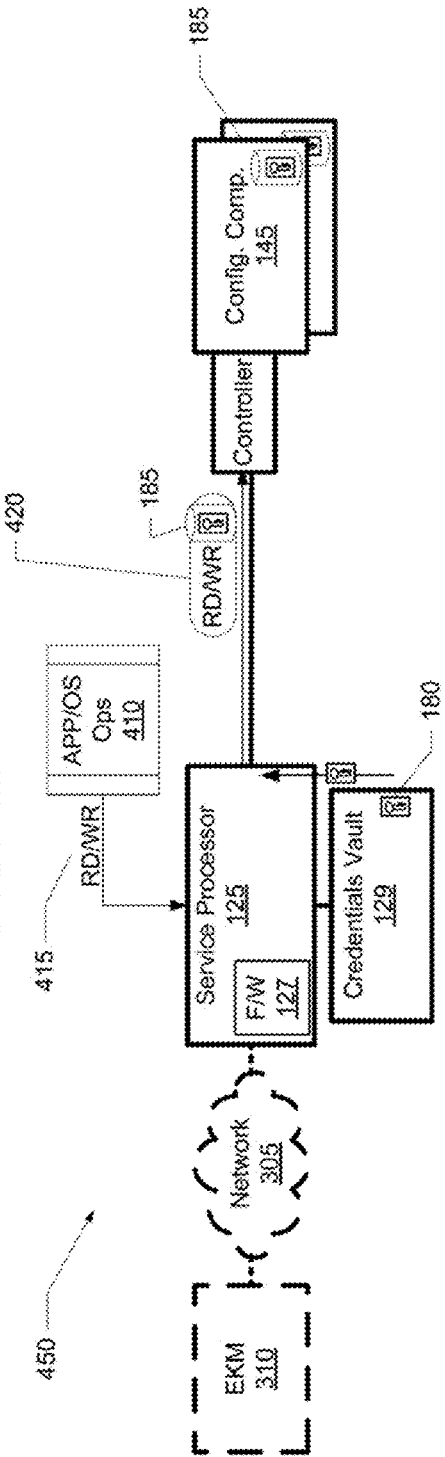
FIG. 4B illustrates a second configuration of a KSE system providing secure access to stored data utilizing a locally-stored KSEK, in accordance with one or more embodiments.

FIGS. 4A and 4B provide system diagrams 400 and 450 that respectively illustrate embodiments of the system supporting remote management of KSEK and local management of KSEK. In the diagram of FIG. 4A, a first configuration of a KSE system 400 provides secure access to secured data 185 stored within storage of configurable components 145 via use of an External Key Manager (EKM) 310. EKM 310 is a remote/external secure storage facility that is communicatively accessible to the service processor 125. EKM 310 can generate KSEK 180 on request from service processor 125, and EKM 310 also manages KSEK 180 in one embodiment. With remote management, the remotely/externally-stored KSEK 180 is received from EKM 310 only following a request from service processor 125. Conversely, in the diagram of FIG. 4B, a second configuration of a KSE system 450 provides secure access to secured data 185 stored within storage of configurable components 145 utilizing KSEK 180 that is locally stored within protected storage 129. In this second configuration, the dashed connection to EKM 310 represents the embodiment in which the EKM 310 generates the KSEK 180 during system initialization. Once the KSEK 180 is generated and forwarded from EKM 310 to service processor 125, service processor 125 stores KSEK 180 within protected storage 129 and utilizes protected storage 129 to provide local management of KSEK 180 during normal processing involving data access via RD/WR operations.

As provided by both figures, following initialization of the system as a KSE system, one Read or Write (RD/WR) operation 415 can be generated by one or both of application 118 and O/S 116 that targets one or more of the storage devices of configurable components 145. For purposes of discussion, this RD/WR operation is assumed to target a storage device of one of the configurable components 145 and to include configuration and/or sensitive customer configuration data. The RD/WR operation is detected and/or intercepted by service processor 125, which responds by automatically retrieving the KSEK 180 from the secure location in which the instance of the key is managed and/or stored. Thus, in FIG. 4A, service processor 125 forwards a KSEK retrieval request to EKM 310, while in FIG. 4B, service processor 125 forwards the KSEK retrieval request to protected storage 129. As mentioned herein, one embodiment can provide that service processor 125 maintains a temporary copy of KSEK 180, particularly when completing a sequence of RD/WR operations that require use of the KSEK 180. This reduces the latency of having service processor having to go to a secure location each time such a RD/WR request is encountered in the system.

With the embodiment of FIG. 4A, the firmware 127 further configures service processor 125 to: responsive to a read/write (RD/WR) request 415 targeting a storage facility of the one or more devices, retrieve the KSEK 180 from the EKM 310, link the KSEK 180 with the RD/WR request 415 to generate a verified RD/WR request 420, and enable completion of the RD/WR request 415 only when the KSEK 180 is verified at the configurable component 145 (i.e., the verified RD/WR request 420 is confirmed as having the proper KSEK 180 to access the data stored in the component's storage device).

According to the embodiment presented by FIG. 4B, the IHS 100 further comprises firmware code that configures the service processor 125 to: store the KSEK 180 within a secure storage associated with the service processor to enable local platform key management, and responsive to a read/write (RD/WR) request 415 targeting a storage device of the one or more configurable components 145, retrieve the KSEK 180 from the secure storage, link the KSEK 180 with the RD/WR request (420), and enable completion of the RD/WR request only when the KSEK 180 is verified at the configurable component 145.

Those of ordinary skill in the art will appreciate that the hardware components and basic configuration depicted in FIGS. 1-4 and described herein may vary. For example, the illustrative components within IHS 100 (FIG. 1) and systems 200/300/400 (FIGS. 2, 3, 4A, 4B) are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

Figure 5A:
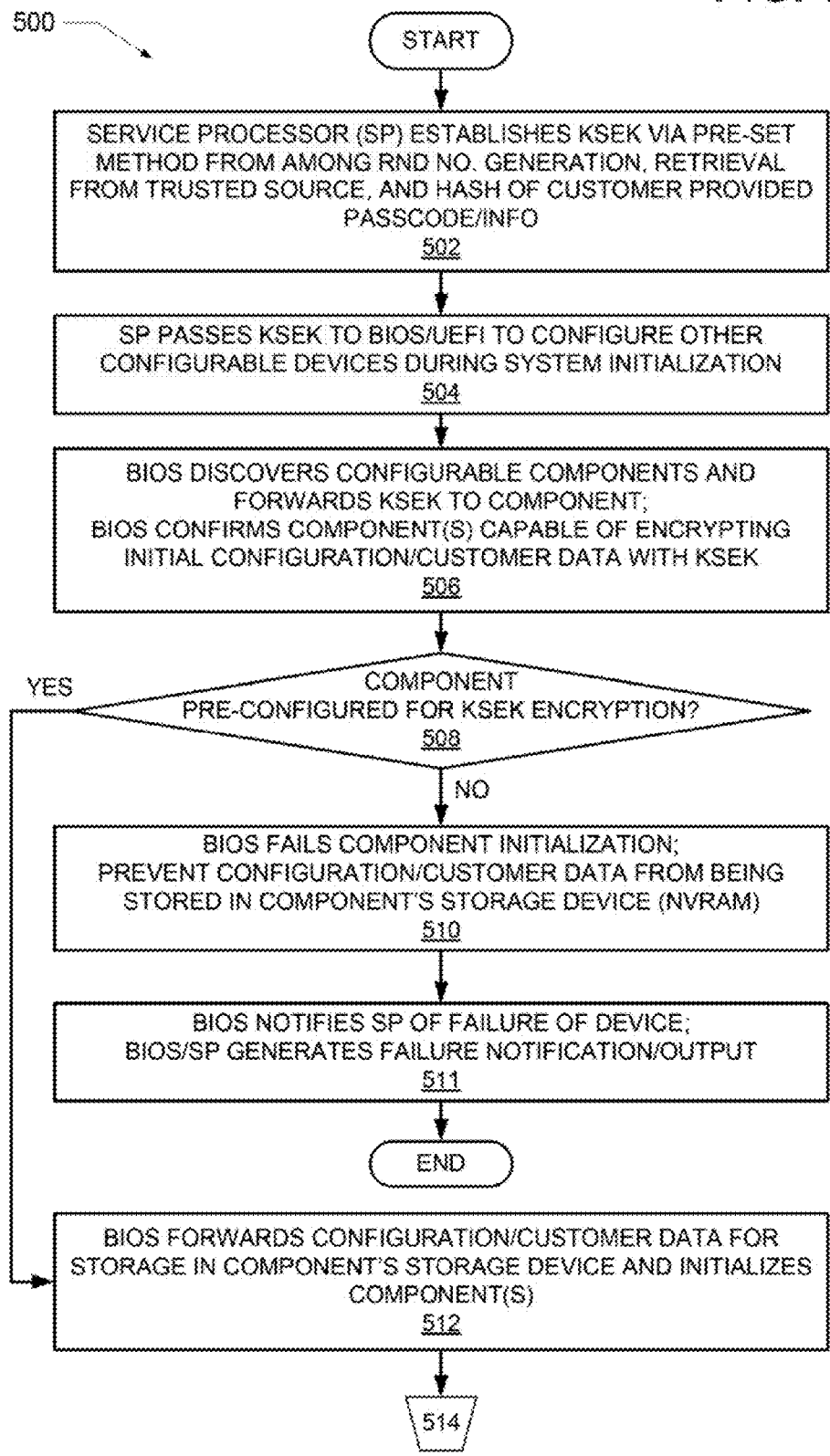
FIG. 5 (5A-5B) is a flow chart illustrating one example of a method by which configurable components within a system are configured to support the single encryption key data security features that enables the system-level kill switch functionality, according to one or more embodiments.
Figure 5B:
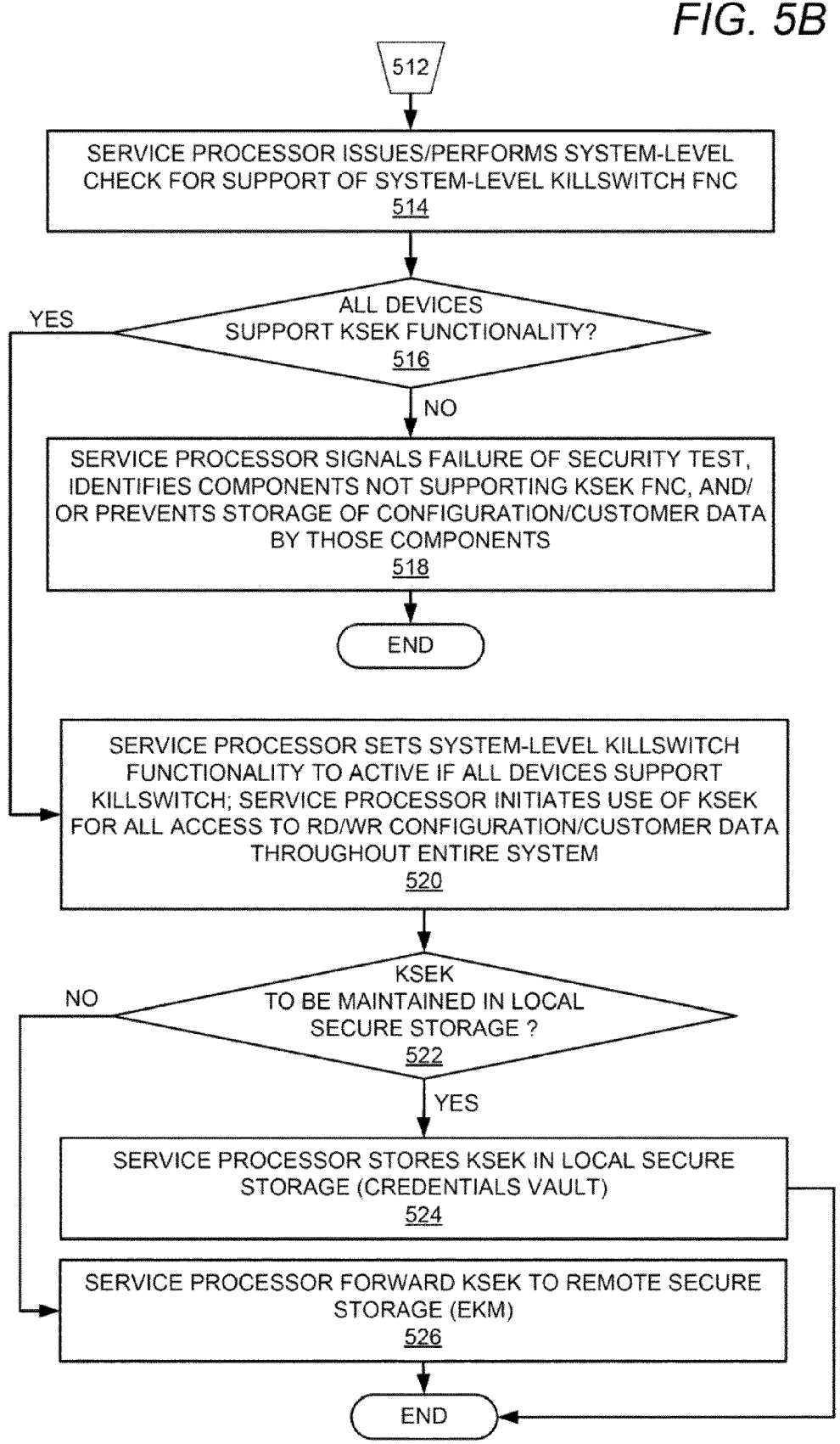
Figure 6:
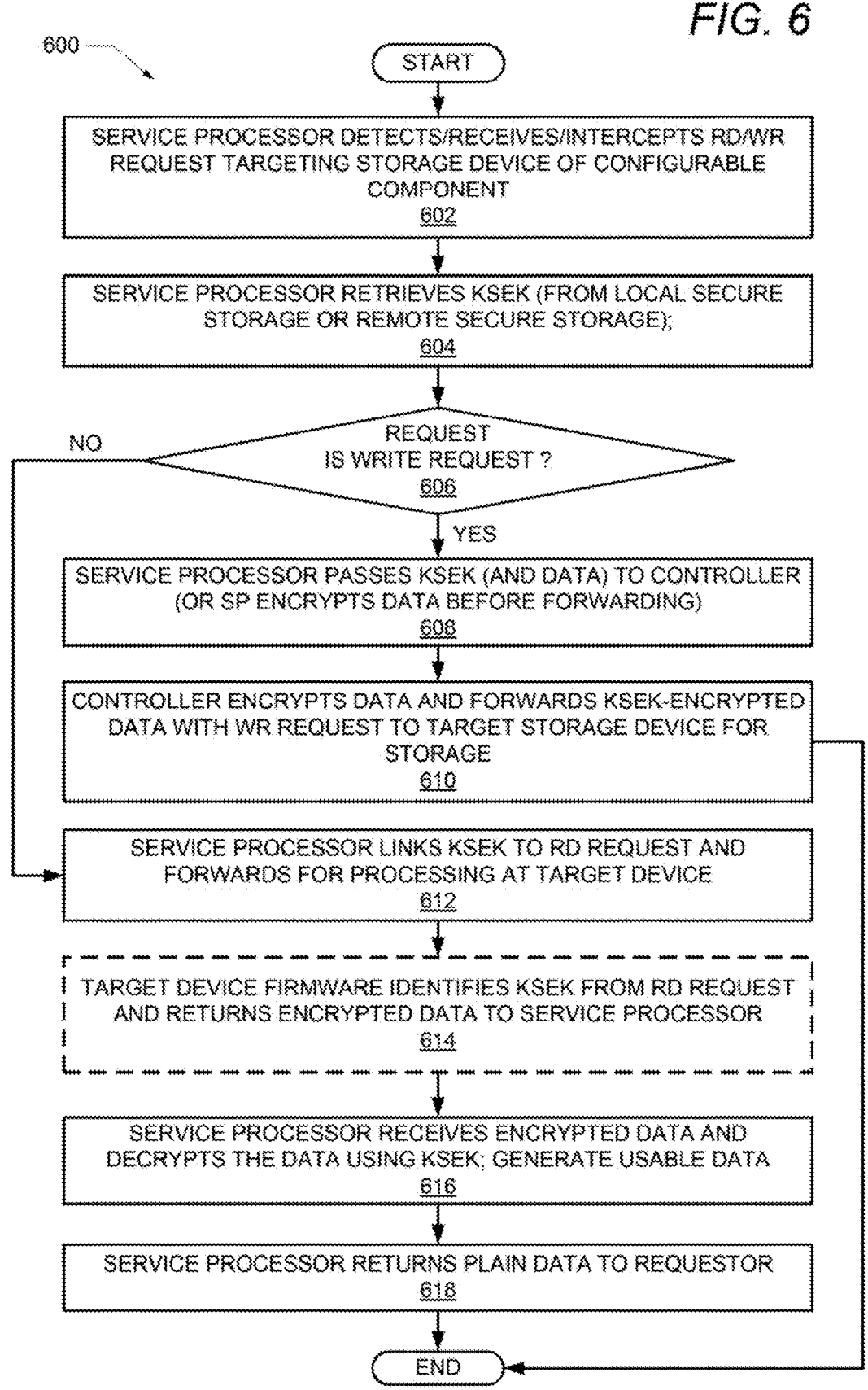
FIG. 6 is a flow chart illustrating one example of a method by which a service processor utilizes a KSEK to provide data security during Read and/or Write (RD/WR) operations within the system, according to one or more embodiments.
Figure 7:
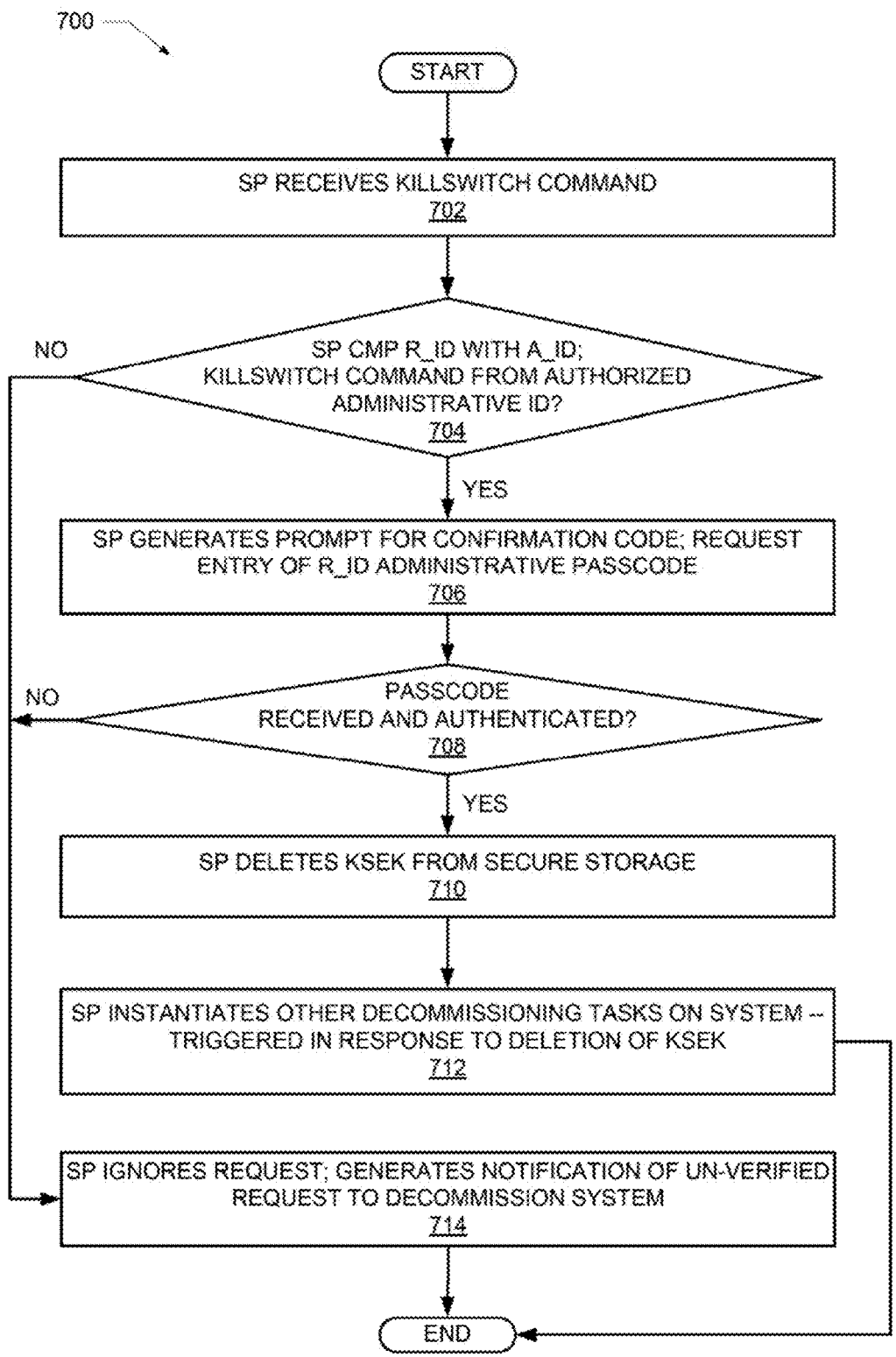
FIG. 7 is a flow chart illustrating one example of the method by which a service processor is able to decommission a system by implementing a system-wide kill switch command, according to one embodiment.

FIG. 5 (5A-5B), FIG. 6 and FIG. 7 illustrate flowcharts of exemplary methods by which a service processor 125, such as iDRAC, within the preceding figures, performs different aspects of the processes that enable the one or more embodiments of the disclosure. Generally, method 500, method 600, and method 700 collectively represent computer-implemented methods to securely initialize configurable components with secured configuration and/or sensitive customer configuration data, to securely update and provide access to the secured data, and to securely decommission a system (with configurable components) containing the secured data. The description of each method is provided with general reference to the specific components illustrated within the preceding figures. Generally each method is described as being implemented via service processor 125 and particularly the execution of code provided by the one or more firmware modules (generally represented as F/W 127) within service processor 125 (see FIGS. 1 and 2). It is, however, appreciated that certain aspects of the described methods may be implemented via other processing devices and/or execution of other code. For example, certain aspects of method 500 are completed via BIOS/UEFI operations and are described as such. For simplicity in describing the methods, all functions are assumed to be completed generally by service processor 125 and/or firmware 127 contained therein, unless expressly stated otherwise.

Method 500 begins at start block and proceeds to block 502 at which service processor 125 establishes a KSEK for utilization when storing to and retrieving data from storage devices of one or more configurable components. According to one embodiment, establishing the KSEK comprises: automatically accessing a remote enterprise key manager (EKM) during initialization of the IHS; and the service processor requesting the KSEK from the EKM. In an alternate embodiment, establishing the KSEK comprises: the service processor 125 automatically generating the KSEK during initialization of the IHS via one of: (a) determining a hash code of a provided alphanumeric value; and (b) random generation of a value utilizing a random generation code module. Then, responsive to receipt and/or establishment of the KSEK, the service processor passes the KSEK to the BIOS (block 504). On receipt of the KSEK, the BIOS locates and identifies each of the one or more configurable devices during a power on self test (POST), provides a copy of the KSEK to each of the one or more configurable components during system/component initialization, and confirms that each of the one or more configurable components is pre-configured to support utilization of the KSEK for data security (block 506). BIOS 114 determines at block 508 whether the device includes firmware that enables the device to utilize the KSEK to encrypt data stored within the component's NVRAM. The BIOS operation to configure a particular configurable component for use within the pre-configured system fails in response to the particular configurable component not supporting use of the KSEK to encrypt the additional configuration data that is being provided to the component by the BIOS. Thus, as shown at block 510, for each device that has not been pre-configured to support KSEK-encryption of configuration and/or customer data, BIOS fails the component's initialization and prevents configuration and/or customer data from being stored to the component's storage device. BIOS 114 then notifies the service processor of the failure of the particular component and either BIOS or the service processor can generate a notification of the failure to the system administrator (block 511).

For the other devices that do support use of the KSEK, BIOS initializes each of the one or more components that has the firmware required to correctly utilize the KSEK to encrypt data stored on the component's storage device, and BIOS passes additional configuration data to each of the one or more configurable components that are pre-configured to support utilization of KSEK-encryption for data security (block 512). Each of the one or more configurable components that support utilization of the KSEK encrypts the additional configuration data with the KSEK prior to storing the encrypted configuration data within a storage device associated with the configurable component. The BIOS then completes the initialization of the components.

According to one embodiment, aspects of the disclosure provide for a service processor generated platform/system-level kill switch support query that will return "supported" if and only if: (1) all configurable components in the system support the kill switch feature (i.e., customer platform protection via erasure of a single encryption key) and (2) the system's policy enforcer (e.g., service processor firmware or BIOS/UEFI) supports the kill switch feature for the local and/or external KSEK management implementation(s). Once the service processor receives this response of "supported", the service processor can then implement the kill switch function call by simply erasing the KSEK either from the secure storage of the local policy enforcer for local key management or from the remote secure storage of the EKM for external key management.

Thus, referring now to FIG. 5B, according to the above embodiment, and as provided at block 514, the method further comprises: the service processor issuing/performing a system-level data security check that queries each configurable component within the system to determine whether the component supports a system-level kill switch and associated KSEK functions/features. The system-level kill switch feature: (1) enables all stored data of a pre-identified type to be automatically encrypted, using the KSEK, prior to storage and (2) prevents all stored data of the pre-identified type from being accessible following deletion of the KSEK from a secure storage. A determination is made at block 516 whether the security check passed, indicating all devices have been configured to support use of the system-level kill switch and associated KSEK functionality. At block 518, in response to the system-level data security check operation indicating that at least one device does not support the system-level kill switch feature, the service processor signals a failure of the system's security check, identifies the components that caused the failure, and/or prevents storage of configuration and/or customer data within storage of those components failing the security check. However, in response to the platform-level data security check operation indicating that all of the one or more components within the system supports the system-level kill switch and associated KSEK features, the service processor sets the kill switch feature to active (e.g., setting a pre-assigned bit within service processor to a logical 1, where 0 indicates that the system is not a KSE system). Service processor also activates/initiates use of the KSEK for all RD/WR access to configuration and customer data within the entire system (block 520).

Also, at block 522, method 500 includes a determination of whether the KSEK is to be locally managed or remotely managed. In response to the KSEK being locally managed, method 500 provides that service processor: stores the KSEK within a secure storage, such as protected storage 129, associated with the service processor to enable local platform key management (block 524); However, if at block 522, a determination is made that the KSEK is to be maintained and managed remotely at a secure EKM, method 500 provides that the service processor forwards the KSEK along with and/or linked to a unique identifier of the system to EKM (block 526). Method 500 then ends.

Turning now to FIG. 6, method 600 begins at start block and proceeds to block 602 at which a storage device controller of one of the configurable components within the system detects/receives/intercepts a READ or WRITE (RD/WR) request for data targeting the storage device. With the configuration setup completed by method 500 of FIG. 5, the controller is programmed and/or configured to ensure encryption of each data utilizing the KSEK as the data is being written to, and prior to storing the data within, the target storage device.

At block 604, the controller retrieves (via the service processor in one embodiment) the KSEK from one of local secure storage (protected storage 129) and remote secure storage (EKM 310). At block 606, the controller determines whether the request is a write request. In response to the request being a request to write data to a target storage device within the pre-configured system, the method includes the controller utilizing the KSEK to first encrypt the data to generate KSEK-encrypted data (block 608) and then forwarding the KSEK-encrypted data to be stored within the target storage device (block 610).

However, in response to the request (evaluated at block 606) not being a WRITE request, i.e., when the request is a READ request for the stored secured data within the target storage device, the method includes the controller linking the KSEK to READ request and passing the KSEK along with the request to the target storage device to retrieve the stored data (block 612). At block 614, the target device firmware identifies the KSEK and returns the encrypted data to the controller. According to one aspect of the disclosure, method 600 enables the one or more devices to prevent decryption of the stored data unless a valid copy of the encryption key is received with a request to read the stored data. Method 600 proceeds to block 616 at which the controller receives the encrypted data and decrypts the received data using the KSEK to generate usable/readable data. At block 618, the controller returns the decrypted, usable data to the requestor as the response to the request. Method 600 then terminates at end block.

Method 700 of FIG. 7 begins at start block and proceeds to block 702 at which service processor receives a kill switch request/command to activate a system-level kill switch operation (i.e., a global deletion of KSEK from secure storage). Method 700 includes service processor responding to receipt of the kill switch command by: comparing a requestor identifier (R_ID) associated with the kill switch request with a pre-established authorized administrative identifier (A_ID) having a pre-set high level administrative privilege (e.g., a super administrative privilege), and determining if the R_ID matches the A_ID (block 704). Then, in response to the R_ID matching the A_ID, the method includes the service processor generating a prompt for confirmation and/or authentication of the kill switch request. In one embodiment, the prompt includes requesting entry of one or more administrative passcode(s) to confirm that the request is from an A_ID (block 706). In one embodiment, the service processor can also provide a notification explaining the finality and/or severity of carrying out the requested kill switch command. In the illustrative embodiment, the confirmation is assumed to be entry of an administrative passcode to confirm that the request is from an authorized A_ID with the pre-set high level administrative privilege. A determination is made at block 708 of whether the passcode has been received and has been verified as being authentic. The method 700 further includes the service processor performing the deleting of the KSEK from the secure storage only when an affirmative response is received indicating that the administrative passcode has been entered and authenticated. The affirmative response further indicates that the kill switch request is a verified request, where the request is a considered a verified request when correct entry of the administrative passcode is received following confirmation that the R_ID is an authorized A_ID to make the request. Method 700 provides that in response to receiving a verified kill switch request (where the passcode is received and authenticated), the service processor deletes the KSEK from the secure storage (block 710). The stored data can only be decrypted to a usable form by using the KSEK, and thus deletion of the KSEK results in a permanent loss of access to the stored data in each of the one or more storage devices in the IHS 100.

Further, according to one embodiment, and as generally provided at block 712, the method comprises: in response to completing the deletion of the encryption key from the secure key holding facility, the service processor triggers/instantiates other decommissioning/re-purposing tasks on the computer platform, including one or more of: (a) a deletion of all encrypted configuration data and customer data within each storage facility corresponding to the one or more devices within the managed system; and (b) a reset to factory default of all devices and corresponding storage facilities within the managed system.

At block 704, in response to either (a) the R_ID not matching the A_ID, (b) the passcode not being entered (at block 708) after a pre-set timeout period following the generation of the prompt for the confirmation, or (c) an incorrect passcode being entered, the service processor ignores the kill switch request and generates a notification that an un-verified request to decommission the platform was received (block 714). Method 700 then ends.

In the above described flow charts in FIGS. 5, 6, and 7, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

With the above described systems and methods, aspects of the disclosure provide the functionality of a system-level kill switch with single command operation sent to a server and/or other main computing device in order to securely decommission an entire customer system and ensure that all encrypted configuration and customer data existing at the time of the decommissioning can no longer be read from any of the individual devices/components within the system. As provided by one or more embodiments, implementation of the kill switch feature requires highest level privilege, such as a super administrative privilege in order to avoid loss of data and/or Denial of Services attacks. Additional aspects provide that the kill switch functionality can include support for one or both of a local KSEK management and a remote/external KSEK management to limit and control access to the KSEK.

According to one embodiment, remote management of the KSEK can be implemented utilizing a similar methodology to that used in a Key Manager Architecture, where the key is not stored locally on the target platform. With one specific implementation of this embodiment, the locking/unlocking key utilized in a self encrypting drive (SED) solution can be utilized as the KSEK used for the kill switch feature. The effect of the kill switch operation renders all customer specific configuration data in the system to be functionally equivalent to "securely erased". Thus, the implementation of the described innovation offers a quick, robust, and acceptable method to "delete" and/or protect customer configuration data and settings prior to decommissioning or repurposing a system. Further, extending the kill switch functionality to adapters such as host bus adapters, to onboard devices, and to BIOS and Firmware to obtain system-level secure erase functionality provides a system owner and/or user a high level of assurance that the customer data and configuration settings are completely inaccessible when the system is decommissioned and/or repurposed.

Finally, the above described embodiments of the disclosure provide for a system-level kill switch command and also provide that only single instance of the KSEK is maintained within a secure storage. It is however appreciated that alternate embodiments can be implemented in which there are multiple different KSEKs provided for a single system, where each KSEK can be utilized to encrypt data for a different set of configurable components within the system. The single kill switch command could then involve deleting multiple KSEKs from the secured storage(s) rather than a single deletion of a single KSEK. Additionally, with this implementation, a first set of secured data within a first of multiple sets of configurable components within a system can be "securely erased" independent of other secured data in a next set of configurable components by deletion of the KSEK that is associated with KSEK-encryption at the first set of configurable components.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, microcode, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method comprising:
a service processor establishing a kill switch encryption key (KSEK) to provide data security for data stored within one or more storage devices that are associated with one or more configurable components of an HIS, wherein establishing the KSEK comprises:
automatically accessing a remote enterprise key manager (EKM) during initialization of the IHS; and
the service processor requesting and receiving the KSEK from the EKM;
configuring the one or more configurable components to provide access to and enable decryption of data stored within the one or more storage devices only when a valid copy of the KSEK is received from the service processor along with a request for access to the stored data during active running of the IHS;
automatically encrypting, with the KSEK, data that is written to the one or more storage devices; and
in response to receiving a verified request to decommission the IHS, deleting the KSEK from a secure storage at which the KSEK is securely maintained;
wherein the stored data can only be decrypted to a usable form by using the KSEK and deletion of the KSEK results in a permanent loss of access to the stored data in each of the one or more storage devices in the IHS.

2. The method of claim 1, further comprising:
automatically decrypting, with the KSEK, the data that is read from the one or more storage device; and
in response to a request to read the stored data within a target storage device while the IHS is actively running, retrieving the KSEK from the secured storage and passing the KSEK to a controller of the target storage device to enable the controller to retrieve the stored data, decrypting the stored data to create usable data, and providing the usable data as a result of the request.

3. The method of claim 1, further comprising:
in response to a request to write data to a target storage device within the IHS, retrieving the KSEK from the secure storage, forwarding the KSEK and the data to a controller of the configurable component to trigger the controller to encrypt the data using the KSEK to generate KSEK-encrypted data and store the KSEK-encrypted data within the target storage device.

4. The method of claim 1, wherein configuring the one or more configurable components further comprises:
responsive to receipt of the KSEK, passing the KSEK to a basic input output system (BIOS) of the IHS, wherein the BIOS identifies each of the one or more configurable devices during a power on self test (POST), provides a copy of the KSEK to each of the one or more configurable components during component initialization, confirms that each of the one or more configurable components is pre-configured to support utilization of the KSEK for data security, and passes additional configuration data to each of the one or more configurable components that are pre-configured to support utilization of KSEK for data security, wherein each of the one or more configurable components that support utilization of the KSEK encrypts the additional configuration data with the KSEK, prior to storing the KSEK-encrypted configuration data within a storage device associated with the configurable component;
wherein a BIOS operation to configure a particular configurable component for use within the pre-configured system fails in response to the particular configurable component not supporting the use of the KSEK to encrypt additional configuration data that would be provided to the component by the BIOS.

5. The method of claim 1, further comprising:
storing the KSEK within a secure storage associated with the service processor to enable local platform key management, wherein only a single instance of the KSEK is maintained and the KSEK can only be retrieved from the secure storage by the service processor; and
responsive to a read/write (RD/WR) request corresponding to a target storage device of the one or more storage devices, retrieving the KSEK from the secure storage and linking the KSEK with the RD/WR request, wherein completion of the RD/WR request only occurs when a controller of the configurable component receives the RD/WR request along with the KSEK.

6. The method of claim 1, wherein:
the KSEK is maintained and managed remotely at the remote enterprise key manager (EKM) which is communicatively accessible to the service processor, and
the method further comprises responsive to a read/write (RD/WR) request corresponding to a target storage device of the one or more storage devices, retrieving the KSEK from the EKM and linking the KSEK with the RD/WR request, wherein completion of the RD/WR request only occurs when a controller of the configurable component receives the RD/WR request along with the KSEK.

7. The method of claim 1, wherein establishing the KSEK comprises:
the service processor automatically generating the KSEK during initialization of the system via one of: (a) determining a hash code of a provided alphanumeric value; and (b) generating a random value utilizing a random value generation module; and
passing a copy of the KSEK to each of the one or more configurable components during device initialization;

wherein the BIOS identifies each of the one or more configurable devices during a power on self test (POST), confirms that each of the one or more configurable components is pre-configured to support utilization of the KSEK for data security, and passes additional configuration data to each of the one or more configurable components that are pre-configured to support utilization of KSEK for data security; and wherein each of the one or more configurable components that support utilization of the KSEK encrypts the additional configuration data with the KSEK, prior to storing the encrypted configuration data within a storage device associated with the configurable component.

8. The method of claim 1, further comprising:

receiving a request to perform at least one of (a) decommissioning the pre-configured system and (b) re-provisioning the pre-configured system, wherein the request has an associated requestor identifier (R_ID);

comparing the R_ID associated with the request with a pre-established administrative identifier (A_ID) having a pre-set high level administrative privilege;

in response to the R_ID matching the A_ID, generating a prompt for confirmation of the received request and providing a notification indicating a permanent loss of access to data as a result of carrying out the request, wherein prompting for confirmation comprises requesting entry of one or more administrative passcodes to confirm that the request is from an authorized A_ID with the pre-set high level administrative privilege; and performing a deletion of the KSEK from the secure storage only in response to confirmation of the one or more administrative passcodes entered, wherein the request is a verified request when correct entry of the administrative passcode is received following confirmation that the R_ID is an authorized A_ID to make the request.

9. The method of claim 8, wherein the data comprises at least one of configuration data and sensitive customer configuration data stored within the storage devices of the one or more configurable components, and the method further comprises:

in response to completing the deletion of the KSEK from the secure storage, triggering one or more of: (a) a deletion of all encrypted configuration data and customer data within each storage device corresponding to the one or more components within the system; and (b) a reset to factory default of all devices, configurable components, and corresponding storage devices within the system.

10. The method of claim 1, further comprising:

generating a system-level data security check that queries each configurable component within the system to determine whether the component supports a system-level kill switch feature, wherein the system-level kill switch feature (1) enables all stored data of a pre-identified type to be automatically encrypted using the KSEK prior to storage of the KSEK-encrypted data and (2) prevents all stored data of the pre-identified type from being accessible following deletion of the KSEK from a secure storage;

in response to the system-level data security check indicating that at least one configurable component does not support the system-level kill switch feature, signaling a data security risk within the system, stalling one or more processes from occurring within the system, and identifying a location of the configurable component corresponding to the data security risk; and in response to the system-level data security check indicating that all of the one or more configurable components within the system supports the platform-level kill switch feature, providing a response indicating that the system has passed the system-level data security check.

11. An information handling system (IHS) comprising:

a processor;

a memory coupled to the processor via a system interconnect;

one or more configurable components; and a service processor having firmware executing thereon to provide data security and securely decommission devices containing data, wherein the firmware configures the service processor to:

establish a kill switch encryption key (KSEK) to provide data security for data stored within one or more storage devices that are associated with one or more configurable components of the HIS, wherein to establish the KSEK the service processor: automatically accesses a remote enterprise key manager (EKM) during initialization of the IHS; requests and receives the KSEK from the EKM; and stores the KSEK within a secure storage associated with the service processor to enable local platform key management, wherein only a single instance of the KSEK is maintained and the KSEK can only be retrieved from the secure storage by the service processor;

configure the one or more configurable components to provide access to and enable decryption of data stored within the one or more storage devices only when a valid copy of the KSEK is received from the service processor along with a request for access to the stored data during active running of the IHS;

automatically encrypt, with the KSEK, data that is written to the one or more storage devices; and in response to receiving a verified request to decommission the IHS, delete the KSEK from a secure storage at which the KSEK is securely maintained;

wherein the stored data can only be decrypted to a usable form by using the KSEK, and deletion of the KSEK results in a permanent loss of access to the stored data in each of the one or more storage devices in the IHS.

12. The information handling system of claim 11, wherein the firmware further configures the service processor to:

in response to a request to read the stored data within a target storage device during active running of the system: retrieve the KSEK from the secured storage and pass the KSEK to a controller of the target storage device to enable the controller to retrieve the stored data; decrypt the stored data to create usable data; and provide the usable data as a result of the request; and in response to a request to write data to a target storage device within the HIS, retrieve the KSEK from the secure storage; and trigger a storage of KSEK-encrypted data by one of:

(a) encrypting the data to be written with the KSEK to generate the KSEK-encrypted data; and forwarding the KSEK-encrypted data to a controller of the configurable component to trigger the controller to store the KSEK-encrypted data within the target storage device; and (b) forwarding the KSEK and the data to the controller of the configurable component, wherein the controller encrypts the data to be written with the KSEK to generate the KSEK-encrypted data and stores the KSEK-encrypted data within the target storage device.

13. The information handling system of claim 11, wherein the firmware that configures the service processor to configure the one or more configurable components comprises firmware code that configures the service processor to:

responsive to receipt of the KSEK, provide a copy of the KSEK to each of the one or more configurable components during component initialization;

wherein the BIOS identifies each of the one or more configurable devices during a power on self test (POST), confirms that each of the one or more configurable components is pre-configured to support utilization of the KSEK for data security, and passes additional configuration data to each of the one or more configurable components that are pre-configured to support utilization of KSEK for data security;

wherein each of the one or more configurable components that support utilization of the KSEK encrypts the additional configuration data with the KSEK, prior to storing the encrypted configuration data within a storage device associated with the configurable component; and wherein a BIOS operation to configure a particular configurable component for use within the pre-configured system fails in response to the particular configurable component not supporting the use of the KSEK to encrypt additional configuration data that would be provided to the component by the BIOS.

14. The information handling system of claim 11, further comprising firmware code that configures the service processor to:

responsive to a read/write (RD/WR) request corresponding to a target storage device of the one or more storage devices during active running of the IHS, retrieve the KSEK from a secure storage and linking the KSEK with the RD/WR request, wherein completion of the RD/WR request only occurs when a controller of the configurable component receives the RD/WR request along with the KSEK;

wherein the secure storage is one of a local protected storage and a remote storage, and when the secure storage is the remote storage, the KSEK is generated and maintained remotely by an enterprise key manager (EKM) that is communicatively accessible to the service processor.

15. The information handling system of claim 11, wherein the firmware that configures the service processor to establish the KSEK comprises firmware code that configures the service processor to:

generate the KSEK during initialization of the pre-configured system via one of: (a) determination of a hash code of a provided alphanumeric value; and (b) generation of a random value utilizing a random value generation module; and pass the KSEK to the basic input output system (BIOS), wherein the BIOS identifies each of the one or more configurable devices during a power on self test (POST), provides a copy of the KSEK to each of the one or more configurable components during device initialization, confirms that each of the one or more configurable components is pre-configured to support utilization of the KSEK for data security, and passes additional configuration data to each of the one or more configurable components that are pre-configured to support utilization of KSEK for data security, wherein each of the one or more configurable components that support utilization of the KSEK encrypts the additional configuration data with the KSEK, prior to storing the encrypted configuration data within a storage device associated with the configurable component.

16. The information handling system of claim 11, wherein the firmware further configures the service processor to:

receive a request to perform at least one of (a) decommissioning the pre-configured system and (b) re-provisioning the pre-configured system, wherein the request has an associated requestor identifier (R_ID);

compare the R_ID associated with the request with a pre-established administrative identifier (A_ID) having a pre-set high level administrative privilege;

in response to the R_ID matching the A_ID, generate a prompt for confirmation of the received request and provide a notification indicating a permanent loss of access to data as a result of carrying out the request, wherein prompting for confirmation comprises requesting entry of one or more administrative passcodes to confirm that the request is from an authorized A_ID with the pre-set high level administrative privilege; and perform a deletion of the KSEK from the secure storage only in response to confirmation of the one or more administrative passcodes entered, wherein the request is a verified request when correct entry of the administrative passcode is received following confirmation that the R_ID is an authorized A_ID to make the request.

17. The information handling system of claim 16, wherein the data comprises at least one of configuration data and customer data stored within the storage devices of the one or more components and the firmware further configures the service processor to:

in response to completing the deletion of the KSEK from the secure storage, triggering one or more of: (a) a deletion of all encrypted configuration data and customer data within each storage facility corresponding to the one or more components within the system; and (b) a reset to factory default of all devices, configurable components, and corresponding storage devices within the pre-configured system.

18. The information handling system of claim 11, wherein the firmware further configures the service processor to:

generate a system-level data security check that queries each configurable component within the system to determine whether the component supports a system-level kill switch feature, wherein the system-level kill switch feature (1) enables all stored data of a pre-identified type to be automatically encrypted using the KSEK prior to storage of the KSEK-encrypted data and (2) prevents all stored data of the pre-identified type from being accessible following deletion of the KSEK from a secure storage;

in response to the system-level data security check indicating that at least one configurable component does not support the system-level kill switch feature, signal a data security risk within the system, stall one or more processes from occurring within the system, and identify a location of the configurable component corresponding to the data security risk; and in response to the system-level data security check indicating that all of the one or more configurable components within the system supports the platform-level kill switch feature, provide a response indicating that the system has passed the system-level data security check.

* * * * *